June 28, 1960

R. E. BROGAN 2,942,819

PIPE-SUPPORTING DEVICE

Filed Aug. 21, 1956

Inventor
Robert E. Brogan
by
Att'ys

United States Patent Office 2,942,819
Patented June 28, 1960

2,942,819

PIPE-SUPPORTING DEVICE

Robert E. Brogan, 176 N. Main St., Natick, Mass.

Filed Aug. 21, 1956, Ser. No. 605,261

1 Claim. (Cl. 248—58)

This invention pertains to supports, and more especially to means for suspending a pipe, rod or the like from an overhead support; for instance, a roof beam, floor joist or the like.

A principal object of the invention is to provide means for supporting a pipe or the like which is more easily and quickly installed than pipe hangers of customary construction; to provide a pipe-suspending device which can be installed by the use of a hammer as the only tool required and by an unassisted workman; to provide a pipe-suspending device which is simple and which can be made to sell at a low price; which provides for a limited amount of vertical adjustment of the pipe for properly aligning the latter; and which affords a rigid and dependable support for the pipe which is useful for suspending pipe of a wide range of sizes. Other and further objects and advantages of the invention will be pointed out in the following more detailed description and by reference to the accompanying drawings wherein Fig. 1 is a fragmentary elevation, partly in vertical section, showing a portion of a beam or the like and a length of pipe suspended below the beam by means of suspension devices embodying the present invention;

Figure 1:
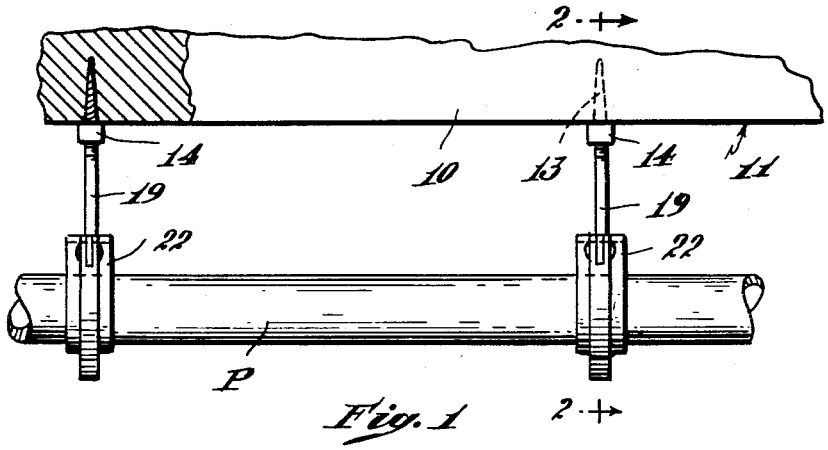

Referring to the drawings, the numeral 10 designates a beam or similar support having a horizontal lower surface 11, while the numeral 12 (Figs. 3 and 4) designates a drive screw forming an element of the pipe-suspending device of the present invention. This drive screw has a shank portion 13 which tapers upwardly when in the position of use and which is provided with screw threads of the conventional type used on drive screws, that is to say, screws which are inserted by blows rather than by turning them. In accordance with the present invention, this drive screw has a head 14 of larger diameter than the thick end of the tapered shank 13, thus providing a distinct shoulder 15 at the junction of the head and shank. This shoulder constituting a stop element to limit the distance to which the screw may be driven into the beam.

The head 14 is provided with an axial bore 16 which is screw-threaded, this bore merging with a counter-bore 17 of a diameter larger than that of the bore 16 so that the screw threads of the bore 16 do not extend all of the way to the end surface 18 of the drive screw. Thus, when the surface 18 is subjected to hammer blows for driving the drive screw into the supporting beam, the screw threads in the bore 16 will not be damaged.

Cooperating with the drive screw is a rigid rod 19 having screw threads 20 at one end which are of proper pitch and diameter to make threaded engagement with the bore 16 of the drive screw. As here illustrated, this rod 19 has a head 21 at its lower end, preferably disk-like in shape and which is designed to support a pipe-embracing band or clasp 22 of any of the customary types commonly employed in pipe hangers. A pipe-embracing band of this type is customarily provided with an opening to receive a suspending element. As here shown, the band 20 is provided with such an opening 22ª through which the bolt 19 is passed. Since the head 21 of the rod is of a diameter exceeding that of the opening 22ª, there is thus provided a swivel connection between the band 22 and the rod 19. Obviously, rods 19 of different lengths may be provided to facilitate the suspension of the pipe at different distances from the beam or joist.

In using this device, the drive screw 12 is driven into the beam by the use of a hammer, this being the only tool necessary in installing the device. Because this device may be installed by the use of a hammer, its installation is much more rapid than that involved in the installation of the customary hanger having a screw-threaded element, for engagement with the beam, which must be turned by the use of a wrench, screw driver or the like, and which may usually require the drilling of a starting hole to facilitate the insertion of the screw. A single workman, without assistance, may easily install the drive screw 12 by a few blows of a hammer. After the drive screw has thus been installed, the rod 19 is threaded through the opening 22ª in the pipe-embracing band 22; and then, the screw-threaded end 20 of the rod 19 is screwed into the threaded bore or socket 16 in the drive screw. Since the bore 16 may be of substantial length, it is possible to provide some degree of vertical adjustment of the head 21 of the rod 19 with respect to the undersurface 11 of the beam 10, thus facilitating the alignment of the pipe P.

Figures 2, 3, 4:
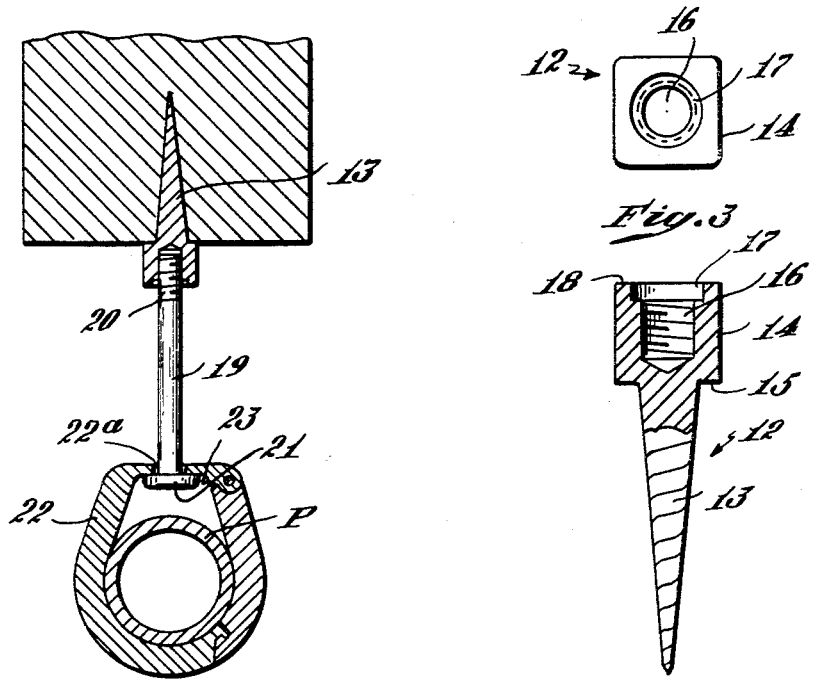
Fig. 2 is a vertical section to larger scale on the line 2—2 of Fig. 1.
Fig. 3 is a view looking up at the lower end of a drive screw forming an essential element of the pipe-suspending device of the present invention; and, Fig. 4 is a side elevation of the drive screw of Fig. 3, the screw being shown in inverted position and with the head portion thereof in vertical section.

As will be noted by inspection of Fig. 3, the head 14 of the drive screw is polygonal in shape, thus facilitating the application of a wrench or the like if it be desired at any time to remove the drive screw from the beam.

While one desirable embodiment of the invention has herein been illustrated and described by way of example, it is to be understood that the invention is broadly inclusive of any and all modifications falling within the scope of the appended claim.

I claim:

A pipe support comprising a drive screw having a tapered shank threaded with a long lead, and an integral broad, deep driving head for receiving the impact of a hammer for driving the screw into a support, said head being of polygonal shape to facilitate application of a wrench thereto, to remove the screw when desired, a shoulder at the junction of the shank and head for limiting the depth to which the drive screw may be driven, an axial screw-threaded bore in the outer end of the head for detachably receiving an end of a hanger rod having screw threads at one end for engagement with the threaded bore in the head of the drive screw, an annular counter-bore at the outer end of and of larger diameter than the screw-threaded bore to protect the screw threads in the head from damage while driving the screw into a support, and a hanger rod threaded at one end to engage said axial screw-threaded bore and having a disk-like head at the opposite end of the rod to which a pipe hanger band may be secured.

References Cited in the file of this patent

UNITED STATES PATENTS

| 168,217 | Blake | Sept. 28, 1875 |
| 488,195 | Goldie | Dec. 20, 1892 |
| 1,730,406 | Chandler | Oct. 8, 1929 |

FOREIGN PATENTS

| 654,181 | Great Britain | June 6, 1951 |